United States Patent
Nakayama

(10) Patent No.: US 8,948,153 B2
(45) Date of Patent: Feb. 3, 2015

(54) COMMUNICATION SYSTEM, COMMUNICATION APPARATUS, COMPUTER-READABLE STORAGE MEDIUM HAVING STORED THEREIN COMMUNICATION PROGRAM, AND COMMUNICATION METHOD

(75) Inventor: Satoshi Nakayama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 194 days.

(21) Appl. No.: 13/430,916

(22) Filed: Mar. 27, 2012

(65) Prior Publication Data

US 2013/0176999 A1    Jul. 11, 2013

(30) Foreign Application Priority Data

Jan. 6, 2012 (JP) ................................. 2012-001421

(51) Int. Cl.
*H04W 4/00* (2009.01)
*H04W 72/12* (2009.01)
*H04W 72/14* (2009.01)

(52) U.S. Cl.
CPC .............. *H04W 72/12* (2013.01); *H04W 72/14* (2013.01)
USPC ........... 370/341; 370/338; 370/458; 370/459; 370/445; 370/443

(58) Field of Classification Search
None
See application file for complete search history.

(56) References Cited

U.S. PATENT DOCUMENTS 7,453,854 B2 * 11/2008 Fujishima et al. ............. 370/335
8,131,291 B2 * 3/2012 Jeong et al. .................... 455/434
2004/0131034 A1 * 7/2004 Sugaya ........................... 370/337
2004/0223466 A1 * 11/2004 Schrader et al. ............... 370/321
2004/0235472 A1 * 11/2004 Fujishima et al. ............. 455/434
2005/0135318 A1 * 6/2005 Walton et al. .................. 370/338
2006/0013177 A1 * 1/2006 Saito .............................. 370/338
2006/0225089 A1 * 10/2006 Ikeda .............................. 725/25
2006/0285527 A1 * 12/2006 Gao et al. ...................... 370/338
2007/0213012 A1 * 9/2007 Marin et al. .................. 455/63.3
2007/0230423 A1 * 10/2007 Yoshida et al. ............... 370/338
2009/0017797 A1 * 1/2009 Li et al. ...................... 455/414.1
2009/0122768 A1 * 5/2009 Nakashima et al. .......... 370/338
2009/0190534 A1 * 7/2009 Yamada et al. ............... 370/328

(Continued)

FOREIGN PATENT DOCUMENTS

JP    2010-187147    8/2010

*Primary Examiner* — Ian N Moore
*Assistant Examiner* — Phong La
(74) *Attorney, Agent, or Firm* — Nixon & Vanderhye, P.C.

(57) ABSTRACT

An example communication system includes: a search communication apparatus which searches for another communication apparatus; and a search subject communication apparatus which is searched for by the search communication apparatus. The search communication apparatus includes a search request transmitter which transmits a search request signal. The search subject communication apparatus includes: a search request receiver which receives the search request signal transmitted from the search communication apparatus; and a search response transmitter which transmits a search response signal which is a response to the search request signal received by the search request receiver, to the search communication apparatus. The search communication apparatus further includes a search response receiver which receives the search response signal transmitted from the search subject communication apparatus. The search request transmitter transmits information indicating a transmission enabled period in which the search response transmitter can transmit the search response signal.

14 Claims, 11 Drawing Sheets

(56) References Cited

U.S. PATENT DOCUMENTS

| | | | |
|---|---|---|---|
| 2009/0310573 A1* | 12/2009 | Sim et al. | 370/336 |
| 2010/0222093 A1* | 9/2010 | Imamura et al. | 455/509 |
| 2010/0232415 A1* | 9/2010 | Hayashino et al. | 370/348 |
| 2010/0271959 A1* | 10/2010 | Qi et al. | 370/248 |
| 2012/0120892 A1* | 5/2012 | Freda et al. | 370/329 |
| 2013/0070676 A1* | 3/2013 | Koop et al. | 370/328 |
| 2013/0077558 A1* | 3/2013 | Ukita et al. | 370/315 |
| 2013/0230038 A1* | 9/2013 | Walton et al. | 370/338 |

* cited by examiner

| FRAME TYPE | ADDRESS ID | TRANSMISSION SOURCE ID | VALID PERIOD INFORMATION |

| FRAME TYPE | ADDRESS ID | TRANSMISSION SOURCE ID | NETWORK INFORMATION |

F I G. 1 1
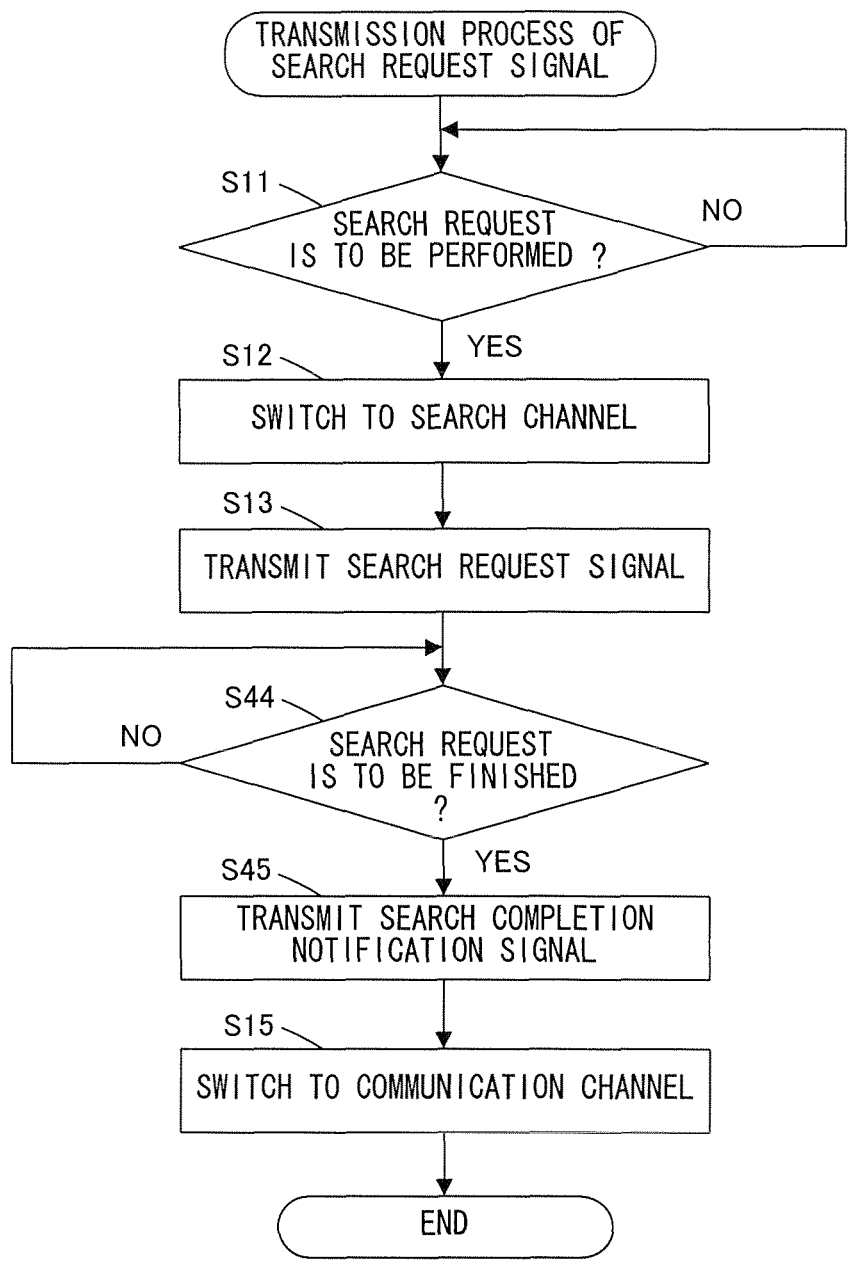

COMMUNICATION SYSTEM, COMMUNICATION APPARATUS, COMPUTER-READABLE STORAGE MEDIUM HAVING STORED THEREIN COMMUNICATION PROGRAM, AND COMMUNICATION METHOD

CROSS REFERENCE TO RELATED APPLICATION

The disclosure of Japanese Patent Application No. 2012-001421, filed on Jan. 6, 2012, is incorporated herein by reference.

FIELD

The exemplary embodiments relate to a communication system, a communication apparatus, a computer-readable storage medium having stored therein a communication program, and a communication method.

BACKGROUND AND SUMMARY

Conventionally, in a communication system, a communication apparatus performing wireless communication may execute scanning for searching for a connection destination.

However, in executing the scanning, if such a conventional communication apparatus cannot receive a response signal from a scan target, the scan target repeatedly transmits the response signal, thus causing fruitless transmission and reception.

Therefore, a feature of the exemplary embodiments provides a communication system, a communication apparatus, a computer-readable storage medium having stored therein a communication program, and a communication method that are capable of suppressing fruitless communication caused when a communication apparatus searches for another communication apparatus.

The exemplary embodiments have the following aspects in order to solve the above problem.

A communication system according to one aspect of the exemplary embodiments includes: a search communication apparatus which searches for another communication apparatus; and a search subject communication apparatus which is searched for by the search communication apparatus. The search communication apparatus comprises a search request transmission section configured to transmit a search request signal. The search subject communication apparatus comprises: a search request reception section configured to receive the search request signal transmitted from the search communication apparatus; and a search response transmission section configured to transmit a search response signal which is a response to the search request signal received by the search request reception section, to the search communication apparatus. The search communication apparatus further comprises a search response reception section configured to receive the search response signal transmitted from the search subject communication apparatus. The search request transmission section transmits information indicating a transmission enabled period in which the search response transmission section can transmit the search response signal.

According to the above aspect, the information indicating the transmission enabled period in which the search response transmission section can transmit the search response signal is transmitted from the search communication apparatus. Therefore, occurrence of fruitless communication can be prevented.

In another aspect, the search request transmission section may transmit the search request signal that includes information about a valid period which indicates the transmission enabled period. In this case, the search response transmission section transmits the search response signal to the search communication apparatus, in the valid period.

According to the above aspect, the transmission enabled period in which the search response transmission section can transmit the search response signal is limited to the valid period included in the search request signal received by the search subject communication apparatus. Therefore, the search subject communication apparatus will not continue to transmit the search response signal in vain, thereby preventing fruitless communication.

In another aspect, the search request transmission section may transmit a search completion notification signal indicating that search request has been finished, as information indicating the transmission enabled period. In this case, the search request reception section receives the search completion notification signal transmitted from the search communication apparatus. The search response transmission section transmits the search response signal to the search communication apparatus in the period from when the search request reception section has received the search request signal to when the search request reception section receives the search completion notification signal.

According to the above aspect, the transmission enabled period in which the search response transmission section can transmit the search response signal is limited to the period from when the search request reception section has received the search request signal to when the search request reception section receives the search completion notification signal. Therefore, the search subject communication apparatus will not continue to transmit the search response signal in vain, thereby preventing fruitless communication.

In another aspect, the search communication apparatus may further comprise a channel switching section configured to switch a channel used for communication, between a search channel that the search request transmission section uses for communication, and a non-search channel different from the search channel. In this case, the search request transmission section transmits the search request signal when the channel used for communication is the search channel. The channel switching section switches the channel used for communication to the non-search channel when the transmission enabled period has elapsed since the search request signal was transmitted.

According to the above aspect, when the channel used for communication by the search communication apparatus has switched to the non-search channel, the transmission enabled period has been already elapsed, and therefore the search subject communication apparatus does not transmit the search response signal by using the search channel. Therefore, the search response signal which the search communication apparatus cannot receive is not continuously transmitted in vain after the channel of the search communication apparatus has been switched.

In another aspect, the search communication apparatus may further comprise an application execution section configured to execute plural kinds of applications for communicating with another communication apparatus. In this case, the transmission enabled period can be changed with respect to each of the applications.

According to the above aspect, for example, the transmission enabled period can be changed with respect to each communication game (an example of applications) executed in communication with another communication apparatus (game apparatus). Therefore, the transmission enabled period can be set in consideration of the frequency of data communication of each game or the timing of the data communication. Thus, the search subject communication apparatus can transmit the search response signal in a limited period of intervals in the communication game executed by the search communication apparatus.

In another aspect, the search response signal may include identification information about the search subject communication apparatus. In this case, the search communication apparatus establishes communication with the search subject communication apparatus by using the identification information.

According to the above aspect, the search communication apparatus can establish communication with another communication apparatus, based on the search response signal acquired in the search for the other communication apparatus.

In another aspect, the search subject communication apparatus may further comprise a network forming section configured to form a communication network together with another communication apparatus. In this case, the search response signal includes information about the number of communication apparatuses forming the communication network.

According to the above aspect, the search communication apparatus can recognize the number of communication apparatuses included in the communication network that includes the search subject communication apparatus, based on the search response signal acquired in the search for the search subject communication apparatus. Therefore, if a search communication apparatus is to form a communication network together with a large number of communication apparatuses, the search communication apparatus can establish communication with a search subject communication apparatus forming a communication network together with such a large number of communication apparatuses.

In another aspect, the search channel may comprise a plurality of channels. In this case, the channel switching section sequentially switches a channel used when the search request transmission section transmits the search request signal.

According to the above aspect, the search request signals are sequentially transmitted by using a plurality of channels, respectively. Therefore, in the case where a plurality of search subject communication apparatuses using different channels are present around the search communication apparatus, the search request signals can be transmitted by using the respective different channels. Therefore, each of the search subject communication apparatus can receive the search communication signal by using the corresponding channel, and transmit the corresponding search response signal. Thus, the search communication apparatus can search for communication apparatuses, present around the search communication apparatus, that use various channels.

In the above, the exemplary embodiments are described using a communication system as an example. However, the exemplary embodiments may be applied to a communication apparatus, a computer-readable storage medium having stored therein a communication program, or a communication method.

According to the exemplary embodiments, it is possible to provide a communication system and the like that are capable of suppressing fruitless communication caused when a communication apparatus searches for another communication apparatus.

These and other objects, features, aspects and advantages of the exemplary embodiments will become more apparent from the following detailed description when taken in conjunction with the accompanying drawings.

BRIEF DESCRIPTION OF THE DRAWINGS

FIG. 11 is a flowchart showing a non-limiting example of modifications of the transmission process of a search request signal;

DETAILED DESCRIPTION OF NON-LIMITING EXAMPLE EMBODIMENTS

Embodiment

Hereinafter, an embodiment will be described with reference to the drawings. In the present embodiment, a communication system will be described as an example, but the exemplary embodiments are not limited thereto. A communication apparatus that realizes the function of such a communication system, a communication method performed in such a communication system, or a computer-readable storage medium having stored therein a communication program to be executed in such a communication system, may be used.

(Configuration of Hardware of Game Apparatus)

The communication system of the present embodiment is composed of a plurality of communication apparatuses capable of performing wireless communication. In the present embodiment, a game apparatus 10 of hand-held type having a wireless communication function is used as an example of the communication apparatus.

Figure 1:
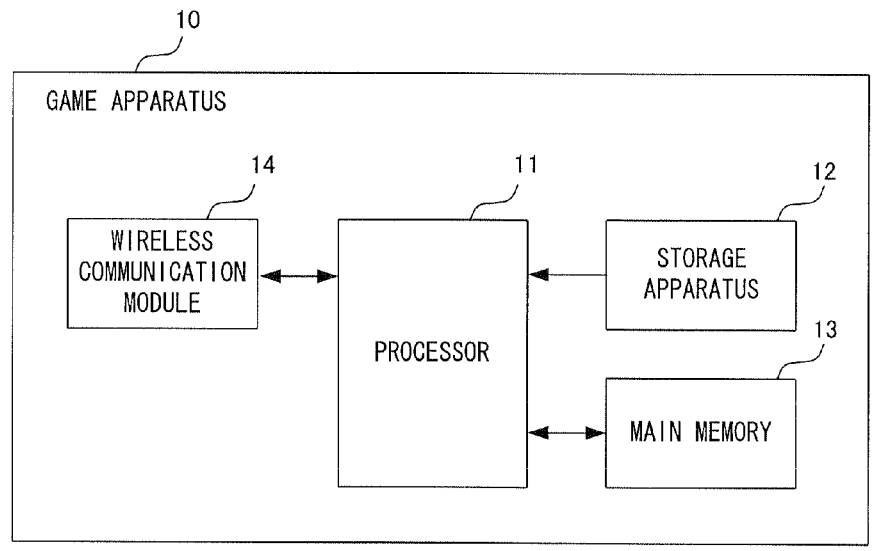
FIG. 1 is a block diagram showing a non-limiting example of the configuration of a game apparatus 10.

FIG. 1 is a block diagram showing a non-limiting example of the configuration of the game apparatus 10. As shown in FIG. 1, the game apparatus 10 includes a processor 11, a storage apparatus 12, a main memory 13, and a wireless communication module 14.

The storage apparatus 12 has stored therein a computer program that is executed by the processor 11. The storage apparatus 12 is, typically, a hard disk or a ROM (Read Only Memory). The main memory 13 temporarily stores a computer program or various data, and also functions as a work area of the processor 11. It is noted that a computer program or data stored in an external storage apparatus may be provided via a communication line or the like to the main memory 13 or the storage apparatus 12, so that the main memory 13 or the storage apparatus 12 stores it.

In addition, the main memory 13 stores a transmission frame or the like in which data to be transmitted to another game apparatus 10 or the like is written. The transmission frame stored in the main memory 13 is outputted to the wireless communication module 14, in accordance with an instruction from the processor 11, and is transmitted via the wireless communication module 14 to another game apparatus 10 or the like. In addition, a reception frame in which data received via the wireless communication module 14 from another game apparatus 10 or the like is written is processed by the processor 11, and is stored in the main memory 13 as appropriate. In addition, the storage apparatus 12 of the game apparatus 10 has stored therein apparatus information (apparatus ID) which is identification information about the game apparatus 10, in a nonvolatile manner. The apparatus ID is written as a transmission source ID in the transmission frame when the transmission frame is transmitted to another game apparatus 10 or the like.

The wireless communication module 14 has a function of establishing connection to a wireless LAN, thereby performing wireless communication with other game apparatuses 10 of the same type, or transmitting data to or receiving data from other apparatuses via the Internet. The wireless communication module 14 outputs the reception frame that has been received, to the processor 11. In addition, the wireless communication module 14 transmits the transmission frame or the like to another game apparatus 10 or the like, as instructed by the processor 11. It is noted that the wireless communication module 14 performs wireless communication by using a channel (frequency band) designated in accordance with the ambient communication condition by the processor 11.

It is noted that the above-described configuration of hardware is merely an example. The exemplary embodiments are applicable to any communication apparatus, or any communication system including any communication apparatuses.

(Summary of Communication System)

Figure 2:
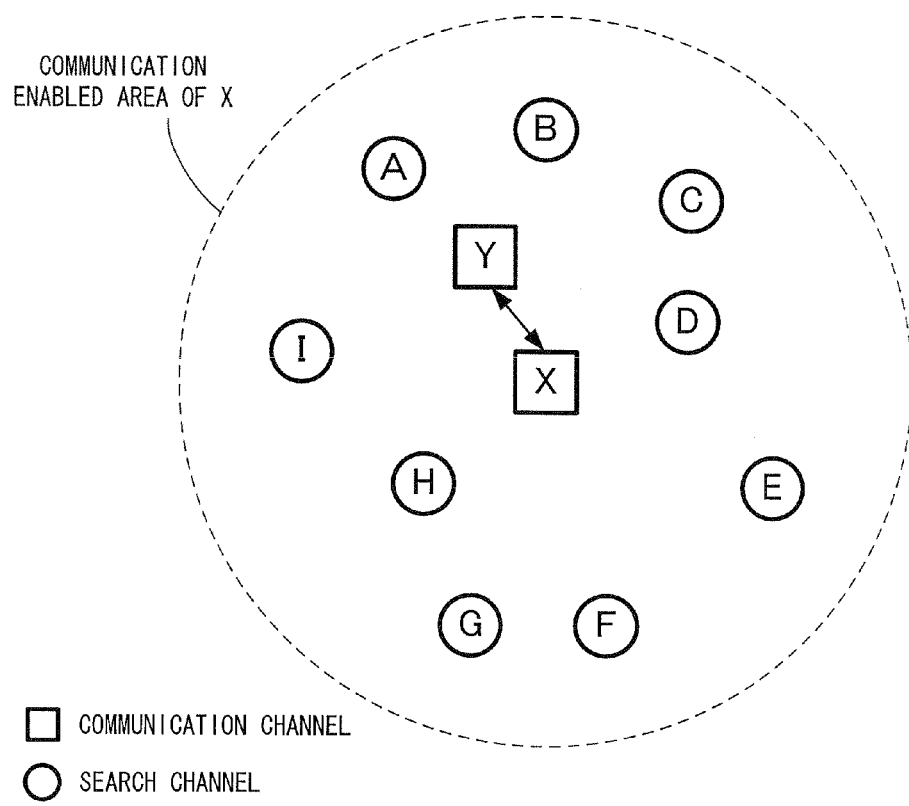
FIG. 2 is a conceptual diagram showing a non-limiting example of wireless communication performed in a communication system including a plurality of the game apparatuses 10.

First, the summary of a communication system of the present embodiment will be described. FIG. 2 is a conceptual diagram showing a non-limiting example of wireless communication performed in the communication system including a plurality of the game apparatuses 10 (game apparatuses X, Y, and A to I).

In the communication system shown in FIG. 2, the game apparatus X is executing a communication game, wirelessly communicating with the game apparatus Y. Here, a channel used for wireless communication by the game apparatus 10 (use channel) is selected from predetermined several channels (for example, 1Ch, 2Ch, and 3Ch) set in the communication system, in accordance with the ambient communication condition (for example, radio wave usage rate of the channel). Hereinafter, it will be assumed that a channel used by the game apparatus X for wirelessly communicating with the game apparatus Y is 1Ch. It is noted that, in the following description, a use channel that a game apparatus uses in wireless communication for transmitting and receiving a game program or game data in order to execute a communication game with another game apparatus, is referred to as a communication channel.

As shown in FIG. 2, in the communication enabled area in which wireless communication with the game apparatus X can be performed, the game apparatus Y which is wirelessly communicating with the game apparatus X by using a communication channel, and the other game apparatuses A to I are present. When the game apparatus X searches for, other than the game apparatus Y, a game apparatus 10 that the game apparatus X can communicate with around the game apparatus X, the game apparatus X transmits a transmission frame (search request signal) indicating the presence of the game apparatus X and the content of the search request, by broadcast. That is, in the present embodiment, the game apparatus X functions as a search communication apparatus.

However, since the game apparatus X is communicating with the game apparatus Y by using the communication channel, even if the game apparatus X transmits the search request signal by broadcast using the communication channel, the game apparatus X cannot search for another game apparatus 10 that uses a different channel (2Ch or 3Ch) from the communication channel. Therefore, the game apparatus X switches the use channel from the communication channel (1Ch) to another channel (2Ch or 3Ch), and transmits a search request signal by broadcast. As a result, the search request signal can reach another game apparatus 10 that uses a different channel (2Ch or 3Ch) from the communication channel. Thus, the game apparatus X can search for another game apparatus 10 that uses a different channel.

Hereinafter, it will be assumed that the use channel of the game apparatuses A to I (search subject communication apparatuses in the present embodiment) is 2Ch, and that the game apparatus X switches its use channel from 1Ch to 2Ch to transmit a search request signal by broadcast. In addition, when a game apparatus (game apparatus X) executing a communication game by using a communication channel transmits a search request signal, a use channel (2Ch) to be used by the game apparatus by switching the communication channel is referred to as a search channel.

Figure 3:
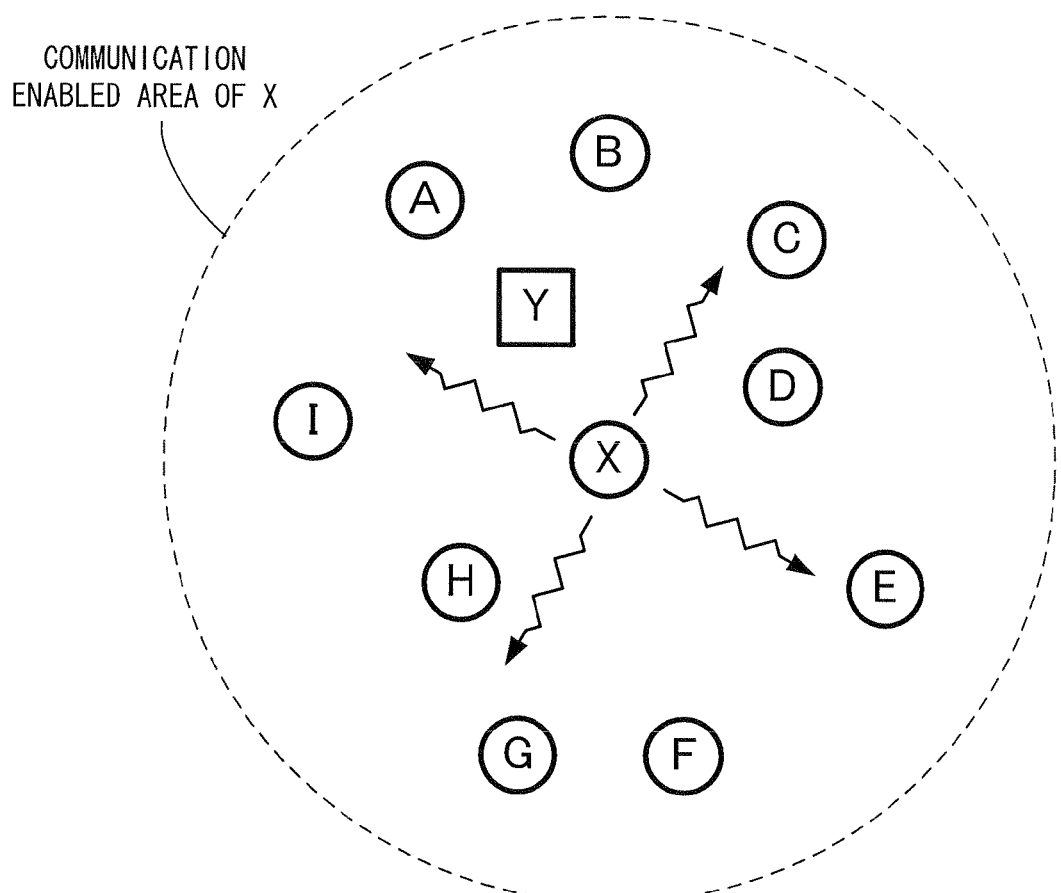
FIG. 3 is a conceptual diagram showing a non-limiting example of wireless communication performed in the communication system including the plurality of game apparatuses 10.

As shown in FIG. 3, the game apparatus X switches the use channel from the communication channel (1Ch) to a search channel (2Ch), and transmits a search request signal, thereby searching for the game apparatuses A to I that use 2Ch. Meanwhile, when the use channel has been switched, the game apparatus X becomes unable to communicate with the game apparatus Y which the game apparatus X has been communicating with by using the communication channel (1Ch) until then. Therefore, it is preferable that the period of using a search channel switched from a communication channel is short, and that the use channel will be switched (returned) to the communication channel soon, so that the communication game performed with the communication apparatus Y will not be disturbed. Therefore, the period during which the game apparatus X can use a search channel by switching the use channel is short, in other words, the game apparatus X can use a search channel by switching the use channel, only during a limited period of intervals in the communication with the game apparatus Y.

The period during which the game apparatus X can use a search channel varies depending on the communication game (an example of applications) that the game apparatus X performs with the game apparatus Y by wireless communication. For example, the higher the frequency of transmission/reception of data in the communication game is, or the larger the influence of the timing of communication in the communication game is, the shorter the period during which the game apparatus X can use the search channel is.

The search request signal transmitted by broadcast by using the search channel (2Ch) reaches (is received by) the game apparatuses A to I that use 2Ch. Then, for example, the game apparatus I transmits, as a response to the search request signal, a transmission frame (search response signal) indicating the presence of the game apparatus I and the content of the search response, to the game apparatus X, by using 2Ch. However, since the period during which the game apparatus X can use the search channel (2Ch) by switching its use channel is short, if the transmission of the search response signal by the game apparatus I is late, maybe the use channel of the game apparatus X will have already returned to the communication channel (1Ch) when the search response signal is transmitted from the game apparatus I to the game apparatus X. Thus, in the case where a search response signal using a search channel (2Ch) is transmitted from the game apparatus I after the use channel of the game apparatus X has returned to a communication channel (1Ch), the game apparatus X cannot receive the search response signal. In such a case, the game apparatus I transmits a search response signal in vain, whereby communication is performed in vain. Therefore, in the communication system of the present embodiment, the period for transmitting a search response signal is restricted in order to prevent occurrence of such fruitless communication.

As shown in FIG. 3, the game apparatus X switches the use channel to the search channel and transmits a search request signal by broadcast. At this time, in addition to information indicating the presence of the game apparatus X and the content of the search request, information indicating a "valid period" in which a search response signal can be transmitted is written in the search request signal (transmission frame). It is noted that the "valid period" is set within the period during which the game apparatus X uses the search channel.

Figure 4:
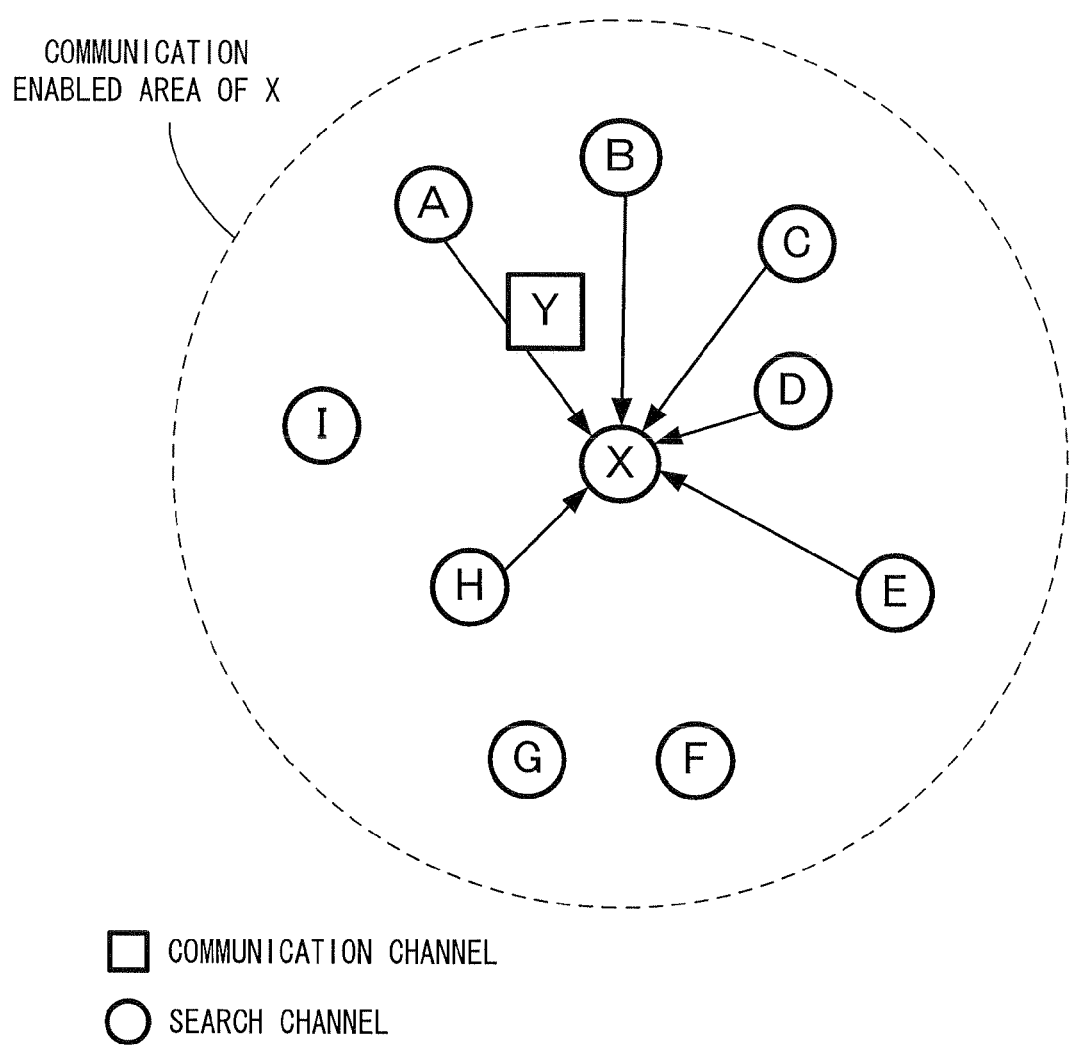
FIG. 4 is a conceptual diagram showing a non-limiting example of wireless communication performed in the communication system including the plurality of game apparatuses 10.

As shown in FIG. 4, the game apparatuses A to I that use the same channel (2Ch) as the search channel receive the search request signal that includes the information indicating the "valid period", and in the "valid period", sequentially transmit search response signals to the game apparatus X. During the "valid period", since the use channel of the game apparatus X is the search channel (2Ch), the game apparatus X can receive the search response signals, thereby recognizing the presences of the ambient game apparatuses (A, B, C, D, E, and H). It is noted that the game apparatuses A to I transmit the search response signals in the order corresponding to the priorities of transmission randomly set for the respective game apparatuses 10, so as not to cross the lines. The game apparatuses A to I are controlled by search response signal transmission control means which control transmission of search response signals, so as not to transmit search response signals after the "valid period" has elapsed.

Figure 5:
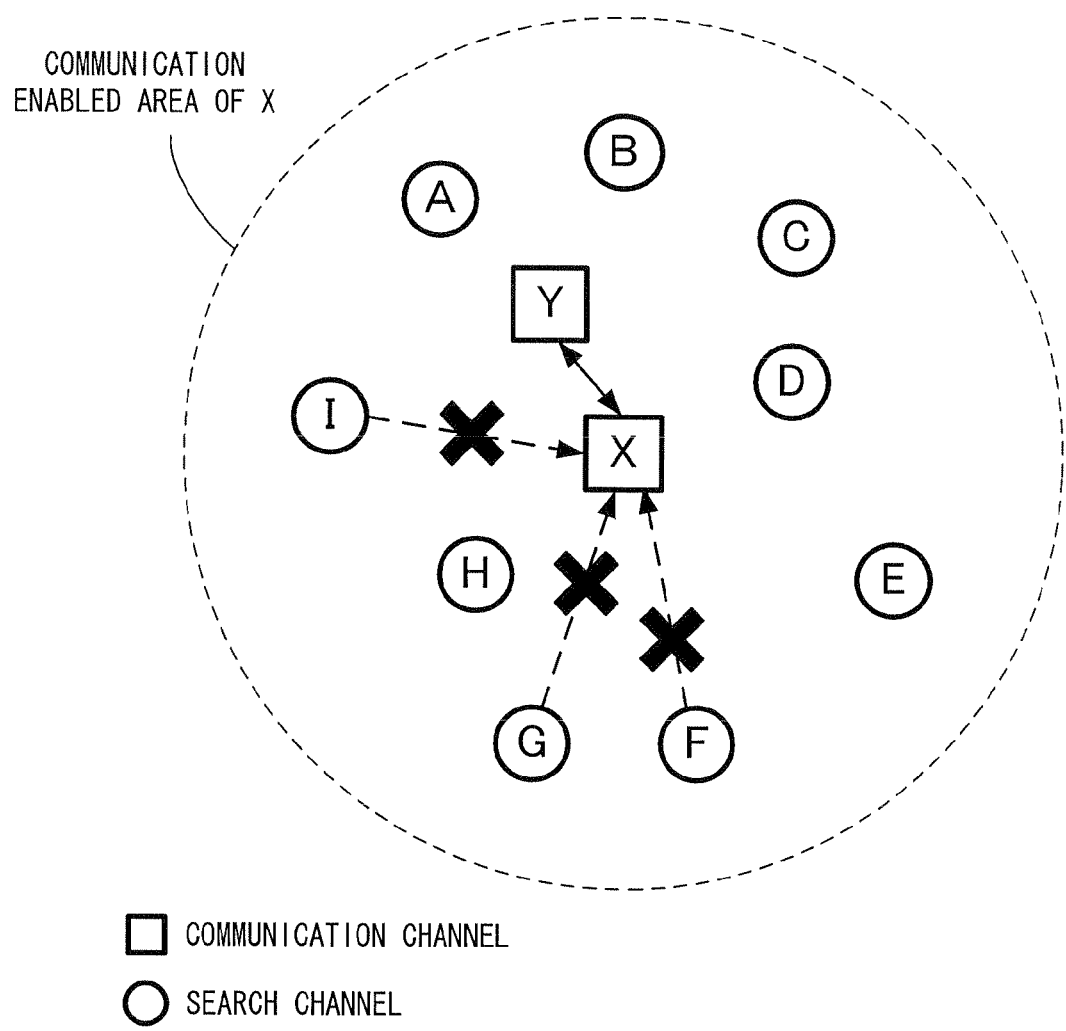
FIG. 5 is a conceptual diagram showing a non-limiting example of wireless communication performed in the communication system including the plurality of game apparatuses 10.

Thereafter, as shown in FIG. 5, the game apparatus X switches the use channel from the search channel to the communication channel, and restarts the transmission with the game apparatus Y. At this time, the "valid period" has already elapsed, and search response signal are not transmitted after the valid period. Therefore, search response signals are not transmitted from the game apparatuses F, G, and I which are relatively late in transmission of search response signals in accordance with the randomly set priorities described above, whereby search response signals can be prevented from being transmitted in vain.

Figure 6:
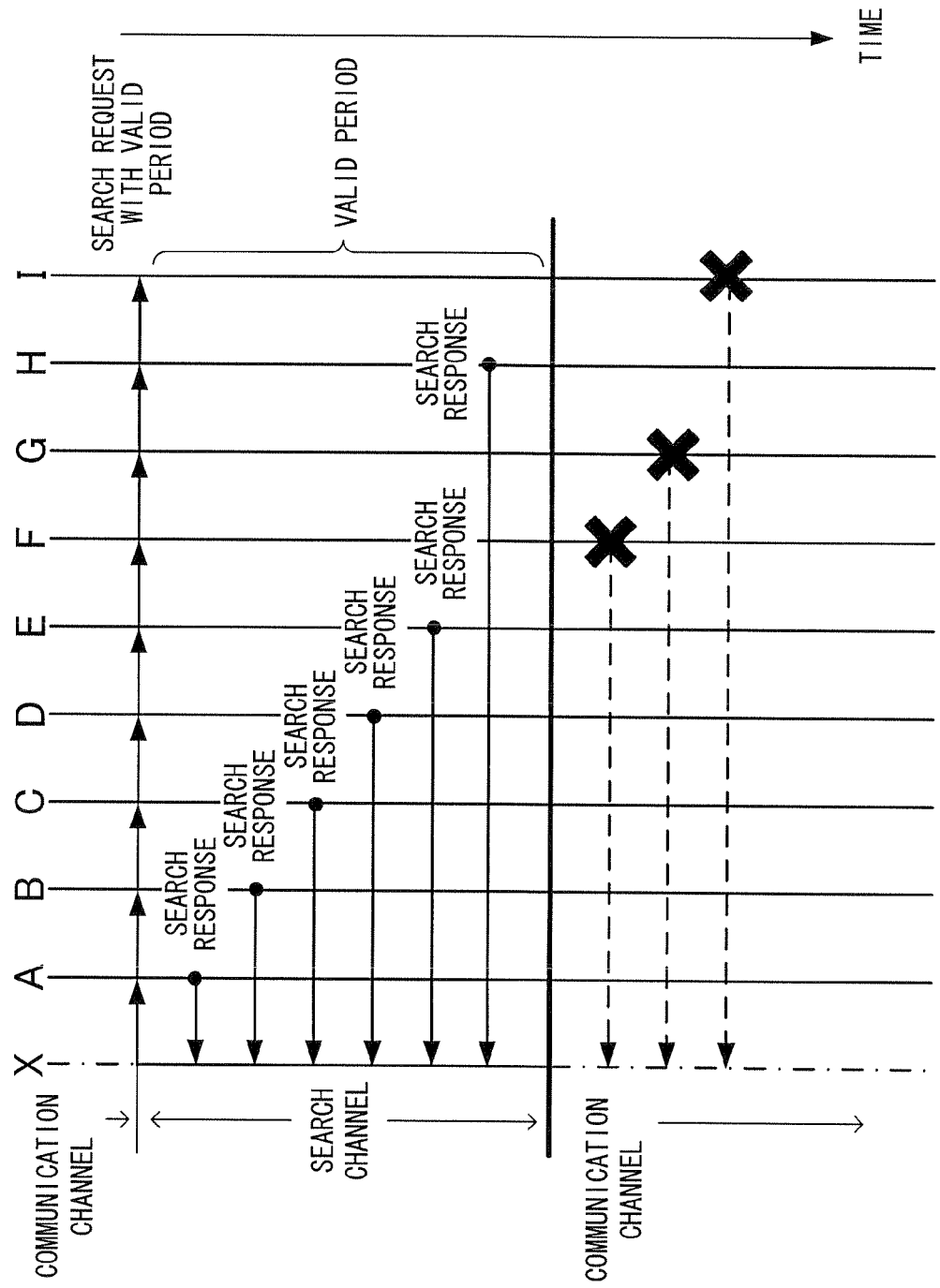
FIG. 6 is a conceptual diagram showing, in chronological order, a non-limiting example of wireless communication performed in the communication system including the plurality of game apparatuses 10.

FIG. 6 shows a non-limiting example of wireless communication in the above communication system in chronological order. It is noted that the order of the priorities of transmission of search response signals set for the game apparatuses A to I are, starting from the highest one, A→B→C→D→E→H→F→G→I.

As shown in FIG. 6, the game apparatus X which has used the communication channel switches the use channel to the search channel, and transmits the search request signal with the valid period. Then, the game apparatuses A to I which have received the search request signal transmit search response signals in the priority order, to the game apparatus X. Here, the valid period ends just before the game apparatus H has transmitted the search response signal. Therefore, because of control by the search response signal transmission control means, the other game apparatuses F, G, and I cannot transmit search response signals. Then, after the valid period has ended, the game apparatus X switches the use channel to the communication channel. Therefore, no search response signal using the search channel is transmitted to the game apparatus X after the game apparatus X has switched the use channel to the communication channel. Thus, fruitless transmission of search response signals is prevented.

At the time when each of the game apparatuses A to I (search subject communication apparatuses) has received the search request signal, the game apparatuses A to I can recognize a transmission enabled period (valid period) in which a search response signal can be transmitted. Therefore, based on the valid period, each of the game apparatuses A to I may determine the priority of transmission of a search response signal to be transmitted, such that the game apparatuses A to I can efficiently transmit the search response signals within the limited period.

(Memory Map)

Figure 7:
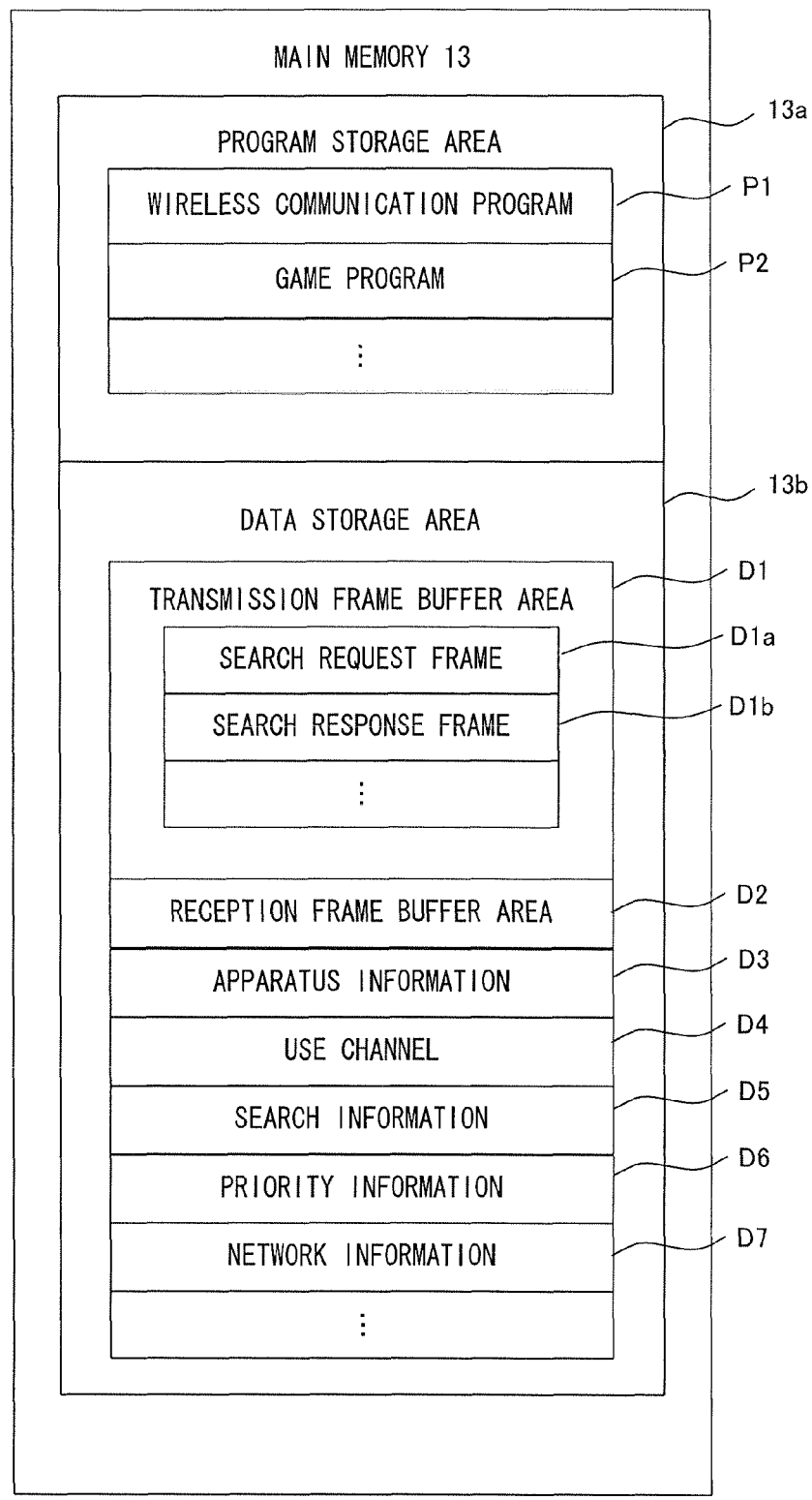
FIG. 7 shows a non-limiting example of a memory map of a main memory 13.

Next, with reference to FIG. 7, various programs and various pieces of data to be stored in the main memory 13 (i.e., the memory map) will be described. As shown in FIG. 7, the main memory 13 includes: a program storage area 13a in which a program loaded from the storage apparatus 12, a program acquired via communication lines from an external storage apparatus, or the like is to be stored; and a data storage area 13b in which temporary data generated in a game process or a communication process is to be stored.

A wireless communication program P1, a game program P2, and the like are to be stored in the program storage area 13a. The wireless communication program P1 is a program defining the whole wireless communication process. If execution of the wireless communication program P1 is started, the wireless communication process is started. The game program P2 is a program defining the whole game process executed by the game apparatus 10.

The data storage area 13b includes a transmission frame buffer area D1 and a reception frame buffer area D2. Apparatus information D3, use channel information D4, search information D5, priority information D6, network information D7, and the like are to be stored in the data storage area 13b.

A search request frame D1a, a search response frame D1b, and the like are to be stored in the transmission frame buffer area D1. When the game apparatus 10 transmits data to another game apparatus 10, a transmission frame prepared in the transmission frame buffer area D1 is used. The reception frame buffer area D2 is a buffer area for, when the transmission frame transmitted from another game apparatus 10 has been received, temporarily storing the transmission frame.

The apparatus information D3 is identification information (ID information) of the game apparatus 10. The use channel information D4 indicates a channel used when the game apparatus 10 communicates with another game apparatus 10.

The search information D5 is identification information about a communication game (an example of applications) that is being executed by wireless communication using a communication channel. The priority information D6 indicates the priority for determining the order of transmission of a transmission frame or the like to another game apparatus 10. The network information D7 is information about a network that the game apparatus 10 forms together with another game apparatus 10 (for example, information about the total number of the game apparatuses 10 included in the same network).

(Structure of Transmission Frame)

Figures 8A, 8B, 9:
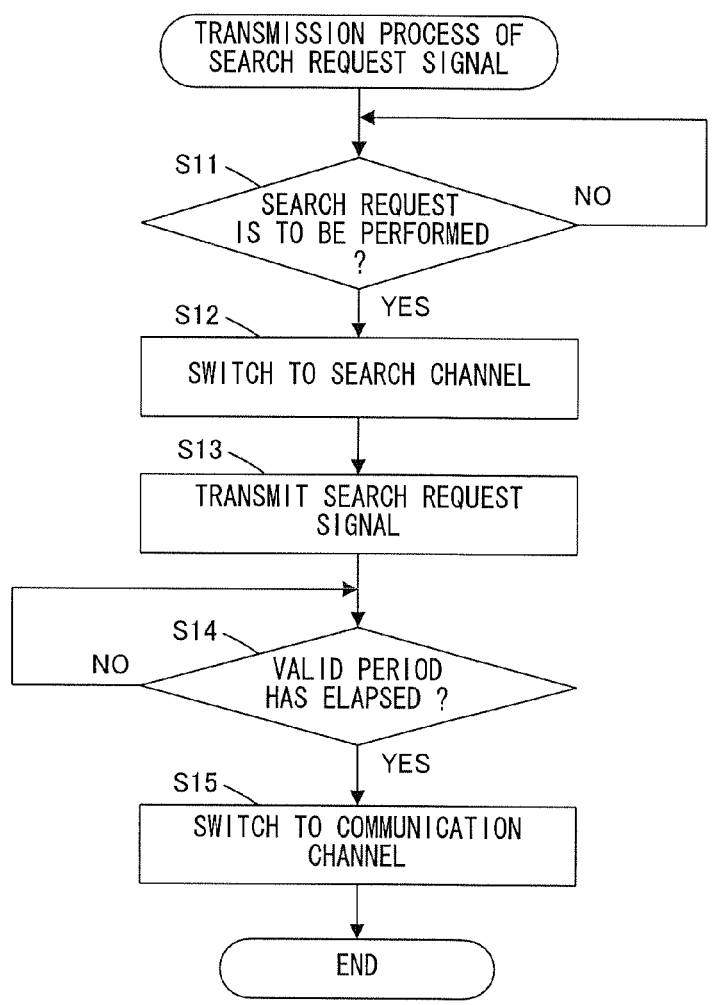
FIG. 8A and FIG. 8B show non-limiting examples of a search request frame and a search response frame.
FIG. 9 is a flowchart showing a non-limiting example of a transmission process of a search request signal.

Next, with reference to FIG. 8A and FIG. 8B, the structures of the transmission frames will be described. FIG. 8A shows a non-limiting example of the structure of the search request frame D1a, and FIG. 8B shows a non-limiting example of the structure of the search response frame D1b.

The search request frame D1a is transmitted as a search request signal by broadcast when the game apparatus 10 searches for another game apparatus 10. As shown in FIG. 8A, the search request frame D1a includes a frame type, an address ID, a transmission source ID, and valid period information. The frame type indicates the type of the transmission frame. In this case, information indicating the search request frame D1a is written in the frame type. In the address ID, identification information about another game apparatus 10 as a transmission destination is written. Since the search request frame D1a is transmitted by broadcast, identification information that allows all the game apparatuses 10 to receive the frame is written in the address ID. In the transmission source ID, identification information about the game apparatus 10 that transmits the search request frame D1a is written based on the apparatus information D3 stored in the data storage area 13b. In the valid period information, information indicating the period in which a transmission frame (search response frame D1b) can be transmitted as a response to the search request frame D1a is written. Specifically, the processor 11 of the game apparatus 10 that transmits the search request frame D1a functions as transmission enabled period setting means for setting the period, and the set period is written as the valid period information in the search request frame D1a. It is noted that the period may be set based on the search information D5, or may be set or changed to any period in accordance with an application program such as a game program. That is, the valid period may be set in accordance with a communication game that the game apparatus 10 is executing through wireless communication using a communication channel. For example, in the case where a communication game having a high frequency of occurrence of communication or a communication game in which the influence of a timing of communication is large is executed, the valid period may be set to be short.

The search response frame D1b is transmitted by the game apparatus 10 that has received the search request frame D1a, to the game apparatus 10 that has transmitted the search request frame D1a. As shown in FIG. 8B, the search response frame D1b includes a frame type, an address ID, a transmission source ID, and network information. In this case, in the frame type, information indicating a search response frame is written. In the address ID, identification information indicating the game apparatus 10 that has transmitted the search request frame is written. In the transmission source ID, identification information indicating the game apparatus 10 that transmits the search response frame D1b is written. In the network information, information about a network that the game apparatus 10 forms together with another game apparatus 10 is written based on the network information D7 stored in the data storage area 13b. Owing to the above structure, the game apparatus 10 that has received the search response frame D1b can obtain information about a network that other game apparatuses 10 form, and based on the information, can select another game apparatus 10 to be connected.

Next, the flow of a process for transmitting the search request frame D1a, that is, a process for transmitting a search request signal will be described.

(Flow of Transmission Process of Search Request Signal)

With reference to FIG. 9, the transmission process of a search request signal executed by the processor 11 of the game apparatus 10 will be described. The transmission process of a search request signal shown in FIG. 9 is executed by the processor 11 of the game apparatus 10 executing the wireless communication program P1. Hereinafter, it will be assumed that the game apparatus X shown in FIG. 2 is the game apparatus 10 (search communication apparatus) that transmits a search request signal.

At first, the game apparatus X has been powered on, and is communicating with another game apparatus Y (see FIG. 2) by using a communication channel (1Ch), executing a communication game. Then, in step S11, the processor 11 of the game apparatus X determines whether or not to search for other game apparatuses A to I (see FIG. 2). Specifically, the processor 11 of the game apparatus X determines whether or not it is time to issue a search request, based on a predetermined timing (scan timing) of issuing a search request. It is noted that the scan timing may be periodic, or may be set as appropriate in accordance with a communication game. If the result of the determination is YES, the process proceeds to step S12. If the result of the determination is NO, the process returns to step S11 to repeat processing of step S11 until the scan timing.

In step S12, the processor 11 of the game apparatus X switches the use channel from the communication channel (1Ch) to the search channel (2Ch). Then, the process proceeds to step S13.

In step S13, the processor 11 of the game apparatus X transmits a search request signal by using the search channel (2Ch). Specifically, the processor 11 of the game apparatus X may transmit, via the wireless communication module 14, the search request frame D1a stored in the transmission frame buffer area D1 of the main memory 13. Thus, a search request signal including the identification information about the game apparatus X, and the valid period is transmitted by broadcast. Then, the process proceeds to step S14.

In step S14, the processor 11 of the game apparatus X determines whether or not the valid period has elapsed. Specifically, the processor 11 of the game apparatus X has stored, in the main memory 13, the valid period information written in the search request frame D1a. The processor 11 determines whether or not the valid period has elapsed, based on the stored valid period information, and information about the current time. If the result of the determination is YES, the process proceeds to step S15. If the result of the determination is NO, the process returns to step S14 to repeat processing of step S14 until the valid period has elapsed.

In step S15, the processor 11 of the game apparatus X switches the use channel from the search channel (2Ch) to the communication channel (1Ch), and ends the transmission process of the search request signal.

It is noted that the above transmission process of a search request signal is executed with a predetermined period (e.g., every 1/30 second). If the scan timing is periodic, the transmission process of a search request signal may be executed in accordance with the scan timing. In this case, the determination processing of step S11 is omitted, and the process starts from step S12.

Next, the flow of a process for transmitting the search response frame D1*b*, that is, a process for transmitting a search response signal will be described.

(Flow of Transmission Process of Search Response Signal)

Figure 10:
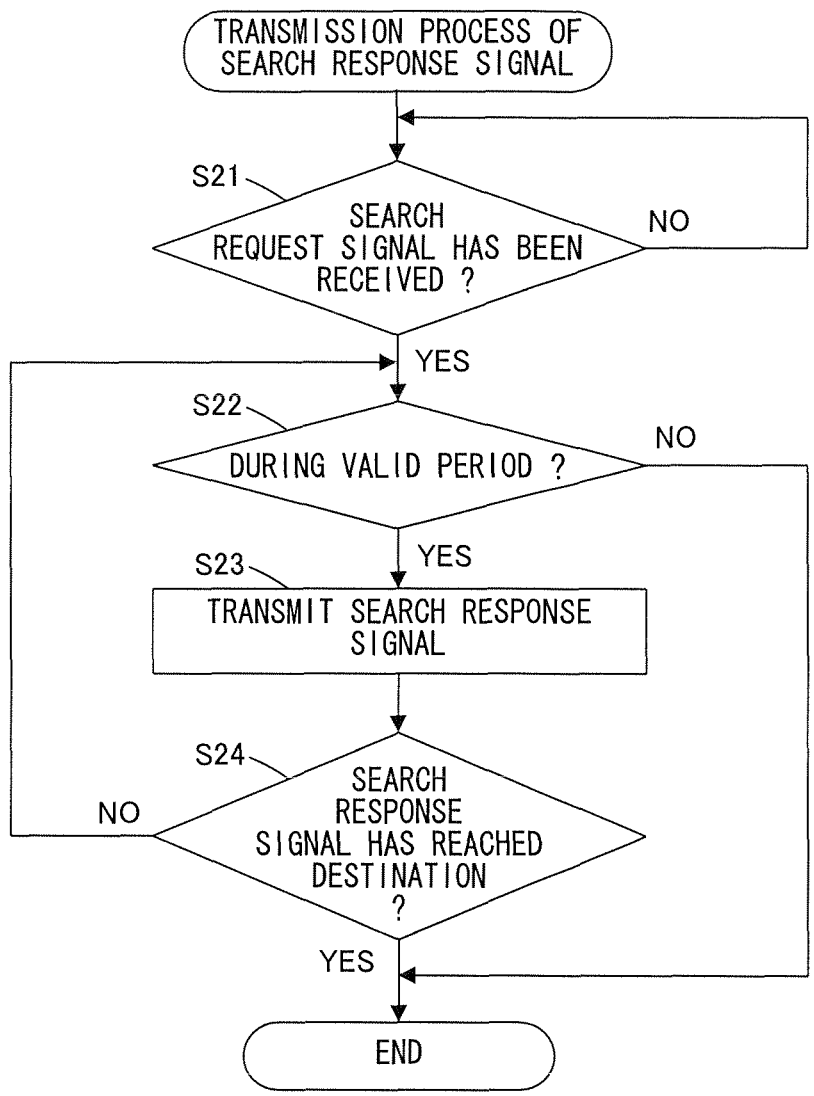
FIG. 10 is a flowchart showing a non-limiting example of a transmission process of a search response signal.

With reference to FIG. 10, the transmission process of a search response signal executed by the processor 11 of the game apparatus 10 will be described. The transmission process of the search response signal shown in FIG. 10 is executed by the processor 11 of the game apparatus 10 executing the wireless communication program P1. Hereinafter, it will be assumed that the game apparatus A shown in FIG. 2 is the game apparatus 10 (search subject communication apparatus) that transmits a search response signal.

At first, the game apparatus A has been powered on, and is waiting to receive a search request signal, using the use channel (2Ch) designated by the processor 11 of the game apparatus A. Then, in step S21, the processor 11 of the game apparatus A determines whether or not a search request signal has been received. If the result of the determination is YES, the process proceeds to step S22. If the result of the determination is NO, the process returns to step S21 to repeat processing of step S21 until a search request signal is received.

In step S22, the processor 11 of the game apparatus A determines whether or not it is currently in the valid period, based on the search request signal received in step S21 (here, which will be assumed to be a search request signal transmitted from the game apparatus X). Specifically, the processor 11 of the game apparatus A determines whether or not it is currently in the valid period, based on the valid period information included in the search request frame D1*a* from another game apparatus (the game apparatus X) received in step S21. If the result of the determination is YES, the process proceeds to step S23. If the result of the determination is NO, the process ends here (a search response signal is not transmitted).

In step S23, the processor 11 of the game apparatus A transmits a search response signal. Specifically, the processor 11 of the game apparatus A transmits the search response frame D1*b* stored in the transmission frame buffer area D1 of the main memory 13. Thus, the search response signal including the identification information about the game apparatus A, and network information is transmitted to the game apparatus X which has transmitted the search request signal. It is noted that the position, in the order of transmission, of the search response signal from the game apparatus A is determined based on the priority information D6 stored in the data storage area 13*b* of the game apparatus A. Then, the process proceeds to step S24.

In step S24, the processor 11 of the game apparatus A determines whether or not the search response signal has reached (has been received by) the game apparatus X which has transmitted the search request signal. If the result of the determination is YES, the process ends here. If the result of the determination is NO, the process returns to step S22. That is, during the valid period, the search response signal is repeatedly transmitted until the search response signal reaches the game apparatus X.

As described above, the transmission enabled period in which the game apparatus A can transmit a search response signal is limited within the valid period indicated by the search request signal from the game apparatus X received by the game apparatus A (YES in step S22, and subsequent step S23 in FIG. 10). In addition, when the use channel of the game apparatus X has returned to the communication channel (1Ch) (step S15 in FIG. 9), the valid period has already elapsed (YES in step S14 in FIG. 9). Therefore, the game apparatus A does not transmit a search response signal, using the search channel (2Ch) (NO in step S22 in FIG. 10). Therefore, after the use channel of the game apparatus X has returned to the communication channel, such a search response signal that the game apparatus X cannot receive any more is not transmitted in vain.

(First Modification)

In the above embodiment, information indicating the valid period (valid period information) is written in the search request frame D1*a*, which is transmitted as a search request signal. However, the information indicating the valid period may not be directly included in a search request signal (search request frame D1*a*) as described above. For example, a search completion notification frame (not shown) may be prepared in the transmission frame buffer area D1, and the transmission enabled period in which a search response signal can be transmitted may be determined by transmission of the search completion notification frame. That is, when the game apparatuses A to I (search subject communication apparatuses) have received the search completion notification frame transmitted from the game apparatus X (search communication apparatus), the search response signal transmission control means may control transmission of search response signals. It is noted that the search completion notification frame is transmitted, by broadcast, as a search completion notification signal for notifying other game apparatuses 10 that the search has been finished. FIG. 11 is a flowchart showing a non-limiting example of a transmission process of a search request signal, including a process in which the game apparatus X (search communication apparatus) shown in FIG. 2 transmits a search completion notification signal to the game apparatuses A to I (search subject communication apparatus). In FIG. 11, the same steps as those in the transmission process of a search request signal shown in FIG. 9 are denoted by the same reference numerals, and the description thereof will be omitted.

As shown in FIG. 11, in step S44, the processor 11 of the game apparatus X determines whether or not to finish transmission of a search request signal. Specifically, the processor 11 of the game apparatus X determines whether or not it is time to finish search request in order to restart the communication with the game apparatus Y (see FIG. 2), based on a predetermined timing of finishing search request (scan finish timing). It is noted that the scan finish timing may be periodic or may be set as appropriate in accordance with a communication game. If the result of the determination is YES, the process proceeds to step S45. If the result of the determination is NO, the process returns to step S44 to repeat processing of step S44 until the scan finish timing.

In step S45, the processor 11 of the game apparatus X transmits a search completion notification signal by using the search channel (2Ch). Specifically, the processor 11 of the game apparatus X transmits, via the wireless communication module 14, the search completion notification frame (not shown) stored in the transmission frame buffer area D1 of the main memory 13. As a result, the other game apparatuses A to I are notified that the transmission of the search request signal has been finished. Then, the process proceeds to step S15.

Figure 12:
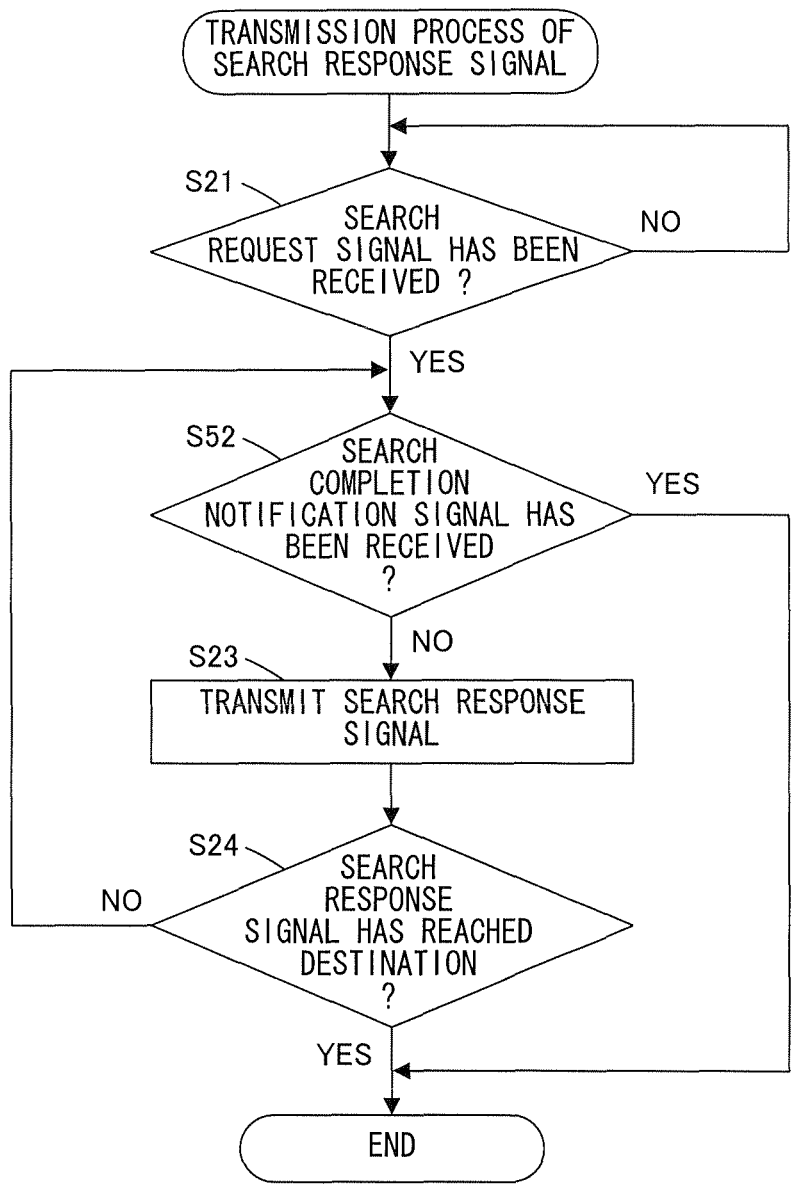
FIG. 12 is a flowchart showing a non-limiting example of modifications of the transmission process of a search response signal.

Next, with reference to FIG. 12, a transmission process of a search response signal executed by the processor 11 of the game apparatus 10 in the case where the above search completion notification signal is transmitted will be described. FIG. 12 is a flowchart showing a non-limiting example of the transmission process of a search response signal, including a process in which the game apparatus A (search subject communication apparatus) shown in FIG. 2 receives the search completion notification signal from the game apparatus X (search communication apparatus) and stops transmission of the search response signal. In FIG. 12, the same steps as those in the transmission process of a search response signal shown in FIG. 10 are denoted by the same reference numerals, and the description thereof will be omitted.

As shown in FIG. 12, in step S52, the processor 11 of the game apparatus A determines whether or not the search completion notification signal transmitted from the game apparatus X by broadcast has been received. If the result of the determination is YES, the process ends here (that is, transmission of the search response signal is finished). If the result of the determination is NO, the process proceeds to step S23 to transmit the search response signal.

As described above, according to the transmission process of a search request signal shown in FIG. 11 and the transmission process of a search response signal shown in FIG. 12, the transmission enabled period in which the game apparatus A can transmit a search response signal (step S23 in FIG. 12) is limited to the period from when the game apparatus A has received a search request signal (YES in step S21 in FIG. 12) to when the game apparatus A has received a search completion notification signal (NO in step S52 in FIG. 12). In addition, when the use channel of the game apparatus X has returned to the communication channel (1Ch) (step S15 in FIG. 11), the search completion notification signal has been already transmitted (step S45 in FIG. 11), and therefore the game apparatus A that has received the search completion notification signal does not transmit a search response signal, using the search channel (2Ch) (YES in step S52 in FIG. 12). Therefore, after the use channel of the game apparatus X has returned to the communication channel, a search response signal that the game apparatus X cannot receive is prevented from being continuously transmitted in vain. In the case where a predetermined period from when the game apparatus X has transmitted a search completion notification signal to when the game apparatus A receives the search completion notification signal is taken into consideration, a step of "waiting for the predetermined period" may be provided between step S45 and step S15 in FIG. 11 so that the game apparatus X can receive a search response signal transmitted in the predetermined period.

(Second Modification)

Figure 13:
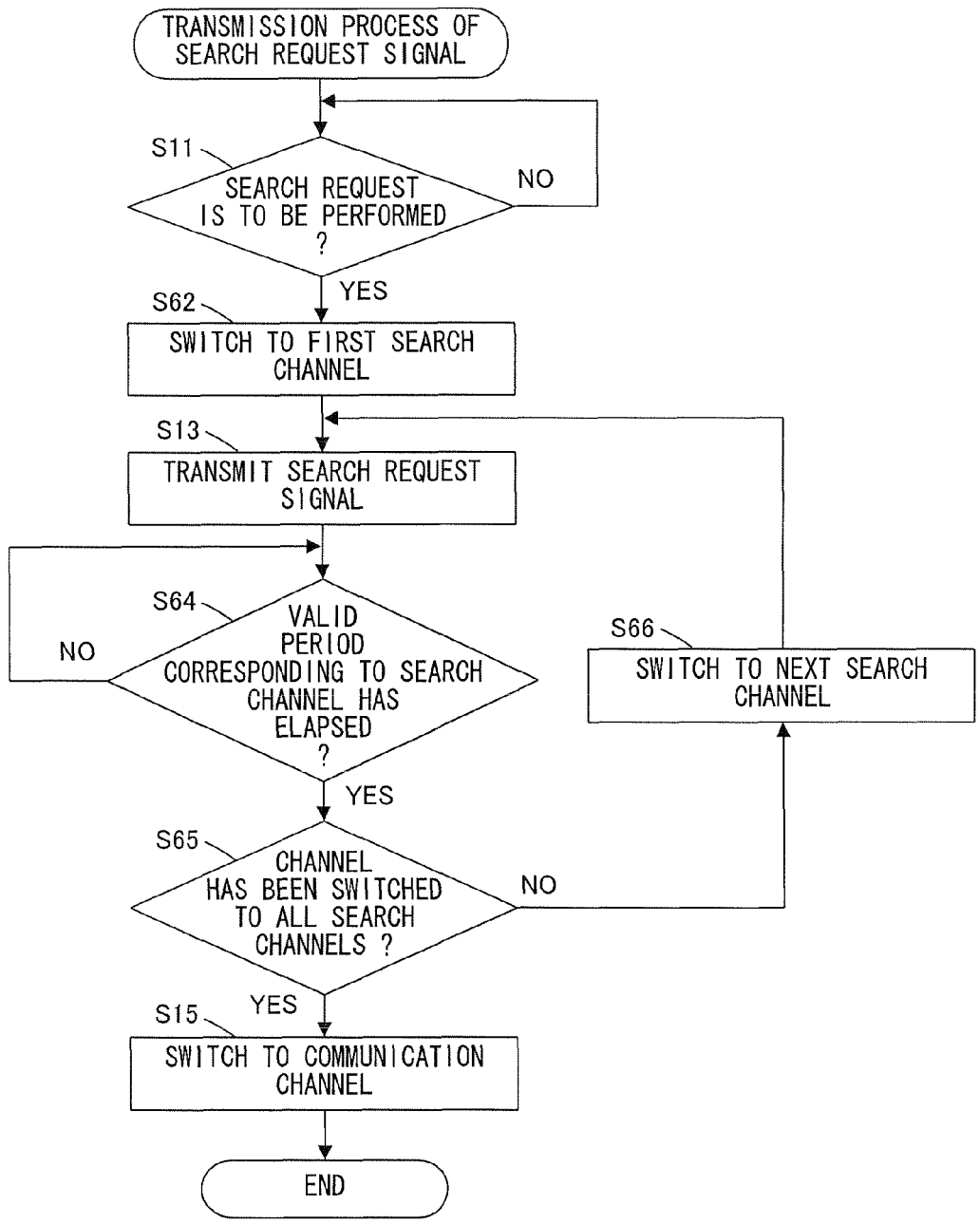
FIG. 13 is a flowchart showing a non-limiting example of modifications of the transmission process of a search request signal.

In the transmission process of a search request signal of the above embodiment, one channel (2Ch) is used as the search channel for the game apparatus X shown in FIG. 2, and the other game apparatuses A to I that use 2Ch are searched for. However, in a communication system including the game apparatuses 10, the channel used by each game apparatus 10 is selected from a plurality of predetermined channels in accordance with the ambient communication condition of the game apparatus 10. Therefore, the other game apparatuses 10 around the game apparatus X do not necessarily use the same channel as in the game apparatuses A to I, but may use different channels. In such a case, the game apparatus X may use a plurality of search channels to search for other game apparatuses 10 around the game apparatus X, and may search for other game apparatuses 10 that use the respective channels different from each other. FIG. 13 is a flowchart showing a non-limiting example of a transmission process of a search request signal in the case where the game apparatus X uses a plurality of search channels. In FIG. 13, the same steps as those in the transmission process of a search request signal shown in FIG. 9 are denoted by the same reference numerals, and the description thereof will be omitted.

As shown in FIG. 13, in step S62, the processor 11 of the game apparatus X switches the use channel to the first channel (2Ch) of a plurality of search channels (for example, 2Ch and 3Ch). Then, the process proceeds to step S13 to transmit a search request signal by using the channel (2Ch) switched in step S62.

In step S64, the processor 11 of the game apparatus X determines whether or not the valid period, which is set for each search channel, has elapsed. Specifically, in writing information in the search request frame D1a, the processor 11 of the game apparatus X writes the valid period information corresponding to the search channel (here, 2Ch) used for transmitting the search request frame D1a, and stores the valid period information in the main memory 13. The game apparatus X determines whether or not the valid period has elapsed, based on the valid period information corresponding to the search channel (2Ch) that is currently used, and information about the current time. If the result of the determination is YES, the process proceeds to step S65. If the result of the determination is NO, the process returns to step S64 to repeat processing of step S64 until the valid period has elapsed.

In step S65, the processor 11 of the game apparatus X determines whether or not the use channel has been switched to all of the plurality of search channels. If the result of the determination is YES, the process proceeds to step S15. If the result of the determination is NO, the process proceeds to step S66.

In step S66, the processor 11 of the game apparatus X switches the use channel to the next search channel (for example, 3Ch). Then, the process proceeds to step S13 to transmit a search request signal by using the channel (3Ch) switched in step S66.

It is noted that the order of selection of the search channels for selecting the first search channel (step S62) and the next search channel (step S66) may be defined in advance based on a predetermined rule.

As described above, in the transmission process of a search request signal shown in FIG. 13, even if a plurality of game apparatuses 10 that use different channels (for example, 2Ch and 3Ch) are present around the game apparatus X, the game apparatus X transmits a search request signal by using each of the different channels (step S62, step S13, and step S66 in FIG. 13). Therefore, each of the game apparatuses 10 can receive the search request signal by using the corresponding channel, and transmit the corresponding search response signal. In this way, the game apparatus X can search for other game apparatuses 10, present around the game apparatus X, that use various channels.

In the second modification, the process (the steps shown in FIG. 13) of sequentially switching the use channel to each of the search channels and transmitting search request signals is executed with a predetermined period. However, the process (the steps shown in FIG. 9) of switching the use channel to one search channel and transmit a search request signal may be executed with a predetermined period, and the one search channel used in the process may be sequentially selected from the above search channels in each execution with the predetermined period.

(Other Modifications)

In the above embodiment, the game apparatus X searches for another game apparatus 10 that uses a channel different from the communication channel of the game apparatus X. However, in the case where the game apparatus X searches for another game apparatus 10 that uses the same channel as the communication channel of the game apparatus X, the game apparatus X, needless to say, can search another game apparatus 10 by transmitting a search request signal without switching the use channel.

In addition, in the above embodiment, the game apparatus 10 is used as an example of communication apparatuses, and the game apparatus X executes a communication game with another game apparatus Y by using a communication channel. However, communication applications that the communication apparatus execute with another communication apparatus by using a communication channel are not limited to a communication game, but may be any applications. In addition, the transmission enabled period in which a search response signal can be transmitted may be set in accordance with any application executed by a communication apparatus.

In addition, in the above embodiment, network information is written in the search response frame D1*b*, that is, a search response signal includes information about a network formed by the game apparatus 10 that transmits the search response signal. However, other than such information, a search response signal may include any information. For example, a search response signal may include unique information such as the number of times the game apparatus 10 has previously communicated with the game apparatus X, and the game apparatus X that has received the information may determine to communicate with the game apparatus 10, based on the information. In addition, such information may be displayed on a display section (not shown) of the game apparatus 10, a user may select another game apparatus 10 based on the information, and the game apparatus 10 may establish communication with the other game apparatus that has been selected.

In addition, in the above embodiment, the priorities of transmission of search response signals from the game apparatuses 10 may be determined in accordance with, for example, whether or not a search response signal from each game apparatus 10 reached the game apparatus X (search communication apparatus) in the previous transmission enabled period. Specifically, the priority of transmission of the game apparatus 10 that has caused a search response signal to reach the game apparatus X in the previous process may be lowered. For example, when the game apparatus 10 that previously caused a search response signal to reach the game apparatus X has received a search request signal again, the game apparatus 10 may not immediately transmit a search response signal, but may wait for a predetermined period to transmit a search response signal. Alternatively, as the rate (success rate) of the number of search response signals that successfully reached the game apparatus X with respect to a predetermined number of transmission enabled periods increases, the priority may be lowered.

In addition, in the above embodiment, the transmission process of a search request signal, and the transmission process of a search response signal are executed by the processor 11 of the game apparatus 10 executing the wireless communication program P1. However, a circuit realizing such functions may execute the transmission processes.

In addition, in the communication system of the above embodiment, the game apparatuses 10 have the same configuration. However, a search communication apparatus (the game apparatus X shown in FIG. 2) that transmits a search request, and a search subject communication apparatus (the game apparatuses A to I shown in FIG. 2) that receives the search request may not have the same configuration. Specifically, a search communication apparatus may have at least a configuration to transmit a search request signal, and a search subject communication apparatus may have at least a configuration to receive the search request signal, and to transmit a search response signal which is a response to the search request signal. Such configurations are applicable to, for example, a communication system in which a server as a search communication apparatus transmits a search request signal to terminal communication apparatuses as search subject communication apparatuses, and based on the search result, the server distributes data to the terminal communication apparatuses. Thus, the communication system of the above embodiment is not limited to including only a plurality of the game apparatuses 10, but may include the game apparatus 10 and an apparatus other than the game apparatus 10 (for example, a distribution server, an information processing apparatus, or a radio wave relay apparatus).

In addition, in the above embodiment, the transmission process of a search request signal or the transmission process of a search response signal is executed by one game apparatus 10. However, a part or the whole of each process may be executed by one or more other apparatuses (for example, a centralized control system) that can perform wired or wireless communication.

In addition, the configuration of the game apparatus 10 described in the above embodiment is merely an example. The game apparatus 10 may have a configuration other than the above configuration. The setting values used in the game apparatus 10, values used in the determinations, the order of steps of the processes executed by the game apparatus 10, and the like are merely examples. Another order of steps or other values may be used.

In addition, in the above embodiment, the wireless communication program to be executed by the game apparatus 10 is supplied to the game apparatus 10 via a storage medium such as the storage device 12. However, the wireless communication program may be supplied to the game apparatus 10 via a communication line. It is noted that instead of a non-volatile storage memory, a CD-ROM, a DVD, a similar optical disc storage medium, a flexible disc, a hard disc, an optical magnetic disc, a magnetic tape, or the like may be used as an information storage medium for storing the wireless communication program. In addition, a volatile memory for temporarily storing the wireless communication program may be used as an information storage medium for storing the wireless communication program.

While the exemplary embodiments have been described in detail, the foregoing description is in all aspects illustrative and not restrictive. It will be understood that numerous other modifications and variations can be devised.

What is claimed is:

1. A communication system including:
    a search communication apparatus that includes (1) a first processing system that includes at least one processor and (2) a first transceiver that is coupled to the first processing system; and
    a plurality of other communication apparatuses, of which at least a second apparatus is searched for by the search communication apparatus, each one of the plurality of other communication apparatuses including, respectively, (1) a second processing system that includes at least one processor and (2) a second transceiver that is coupled to the second processing system,
        the first processing system of the search communication apparatus configured to:
            execute a video game application program and communicate, via the first transceiver, communication data related to operation of the video game application program with at least a first apparatus of the plurality of other communication apparatuses;

switch a communication channel that is being used by the first transceiver, during communication over a non-search channel with at least the first apparatus of the plurality of other communication apparatuses for communicating the communication data related to operation of the video game application program, from the non-search channel to a search channel which is different from the non-search channel for a transmission enabled period;

transmit a search request signal, via the first transceiver and by using the search channel, to at least the second apparatus that is different from the first apparatus;

transmit information indicating the transmission enabled period in which a search response signal can be transmitted; and switch the communication channel being used by the first transceiver back to the non-search channel when the transmission enabled period has elapsed, the second processing system of at least the second apparatus configured to:

receive, via the second transceiver of the second apparatus, the search request signal transmitted from the search communication apparatus; and transmit, via the second transceiver of the second apparatus, the search response signal to the search communication apparatus, the search response signal being a response to the received search request and being transmitted within the transmission enabled period, wherein the first processing system of the search communication apparatus is further configured to receive, via the first transceiver, the search response signal transmitted from the second apparatus, wherein the transmitted information indicating the transmission enabled period in which a search response signal can be transmitted is a value such that a switch to the search channel for the transmission enabled period will not result in disturbing operation of the video game application program with at least the first apparatus of the plurality of other communication apparatuses.

2. The communication system according to claim 1, wherein the search request signal includes the information about a valid period which indicates the transmission enabled period, and the search response signal is transmitted within the valid period.

3. The communication system according to claim 1, wherein:

the first processing system of the search communication apparatus is configured to transmit, via the first transceiver, a search completion notification signal that indicates the search request has been finished, as information indicating the transmission enabled period, the second processing system of at least the second apparatus configured to receive, via the second transceiver, the search completion notification signal transmitted from the search communication apparatus, and wherein the search response signal is transmitted between reception of the search request signal and the reception of the search completion notification signal.

4. The communication system according to claim 1, wherein the first processing system of the search communication apparatus is configured to execute plural kinds of application programs that include functionality for communicating with at least one other communication apparatus, and the transmission enabled period can be changed with respect to each of the applications.

5. The communication system according to claim 1, wherein the search response signal includes identification information about the second apparatus, and the search communication apparatus establishes communication with the second apparatus by using the identification information.

6. The communication system according to claim 1, wherein the second processing system of at least the second apparatus is further configured to:

form, via the second transceiver, a communication network together with at least one further communication apparatus, and the search response signal includes information about a number of communication apparatuses that form the communication network.

7. The communication system according to claim 1, wherein the search channel comprises a plurality of channels, and the first processing system of the search communication apparatus is configured to sequentially switch the communication channel used by the first transceiver when search request signal is transmitted.

8. A communication apparatus comprising:

a transceiver configured to communicate with a plurality of other communication apparatuses including a first communication apparatus and a second communication apparatus; and a processing system that includes at least one processor that is coupled to the transceiver, the processing system configured to:

switch a communication channel that is being used by the transceiver, during communication with at least the first apparatus that is using a non-search channel, from the non-search channel to a search channel which is different from the non-search channel;

transmit, via the transceiver, a search request signal for searching for at least the second communication apparatus;

switch the communication channel being used by the transceiver back to the non-search channel after a search reception enabled period has elapsed;

receive, via the transceiver, a search response signal transmitted from at least the second communication apparatus that has received the search request signal, the search response signal being a response to the search request signal; and transmit, via the transceiver, information indicating the search reception enabled period in which at least the second communication apparatus can transmit the search response signal, wherein the processing system is further configured to execute a video game application program, where communication with at least the first apparatus includes communicating, via the transceiver, data related to the video game application program, wherein the search reception enabled period is a value such that the video game application data being updated between the communication apparatus and at least the first communication apparatus will not be disturbed when the communication channel is switched for the search reception enabled period.

9. A communication apparatus comprising:
a transceiver configured to communicate with other communication apparatuses including a first communication apparatus; and
a processing system that includes at least one processor that is coupled to the transceiver, the processing system configured to:
receive, via the transceiver, a search request signal transmitted from another communication apparatus that has switched from a non-search channel over which the another communication apparatus is communicating with a further communication apparatus to a search channel that is different from the non-search channel;
transmit, via the transceiver, a search response signal which is a response to the received search request signal to the another communication apparatus; and
receive, from the another communication apparatus and via the transceiver, information indicating a transmission enabled period in which the search response signal can be transmitted to the another communication apparatus, after which the another communication apparatus switches from listening on the search channel to communicating upon the non-search channel,
wherein the processing system is further configured to execute a video game application program, where communication with at least the first communication apparatus includes communicating, via the transceiver, data related performance of the video game application program,
wherein the transmission enabled period is a value such that the performance of the video game application program with the first communication apparatus will not be disturbed when the communication channel is switched to the search channel for the transmission enabled period.

10. A non-transitory computer-readable storage medium having stored therein a communication program for use with a communication apparatus, the communication apparatus including a processing system that includes at least one processor coupled to a transceiver, the communication program comprising instructions configured to cause the communication apparatus to:
when the transceiver is being used to communicate with a first communication apparatus over a non-search communication channel, switch the transceiver to a search communication channel that is different from the non-search channel;
transmit, via the transceiver and while the transceiver is switched to the search channel, a search request signal for searching for at least a second communication apparatus;
switch from the search channel back to the non-search channel after a predetermined period of time has elapsed;
accept, via the transceiver, the search response signal transmitted from at least the second communication apparatus that has received the search request signal, the search response signal being a response to the search request signal;
transmit information indicating a transmission enabled period in which the communication apparatus will accept, via the transceiver listening on the search channel, the search response signal;
execute a video game application program that communicates, via the transceiver and the non-search channel, data related to performance of the video game application program to at least the first communication apparatus,
wherein the transmission enabled period is a value such that performance of the video game application program between the communication apparatus and at least the first communication apparatus will not be disturbed when the communication channel is switched to the search channel for the transmission enabled period.

11. A communication method performed in a communication system that includes a search communication apparatus that is communicating with a first communication apparatus and at least a second communication apparatus which is searched for by the search communication apparatus, the communication method comprising:
when a transceiver of the search communication apparatus is communicating with the first communication apparatus by using a non-search channel, switching the transceiver to a search channel that is different from the non-search channel;
transmitting, via the transceiver of the search communication apparatus, a search request signal over the search channel for searching for at least the second communication apparatus;
switching the transceiver of the search communication apparatus from the search channel back to the non-search channel after a predetermined period of time has elapsed from the switch to the search channel;
receiving, via a transceiver of the second communication apparatus, the search request signal transmitted from the search communication apparatus;
transmitting, via the transceiver of the second communication apparatus, a search response signal which is a response to the received search request signal to the search communication apparatus;
receiving, via the transceiver of the first communication apparatus, the search response signal;
transmitting, via the transceiver of the first communication apparatus, information indicating a transmission enabled period in which the second communication apparatus can transmit the search response signal; and
executing, on a processor of the search communication apparatus, a video game application program, where communication with at least the first apparatus includes communicating video game application data related to operation of the video game application program,
wherein the transmission enabled period is a value such that the operation of the video game application program via communication of the video game application data will not result in disturbing operation of the video game application program when the communication channel is switched to the search channel for the transmission enabled period.

12. The communication apparatus of claim 8, wherein the video game application program is a type of video game application program and the processing system is further configured to:
set the search reception enabled period based on the type of video game application program that is being executed.

13. The communication apparatus of claim 12, wherein the search reception enabled period is set based on a frequency of communicated updates for the video game application program.

14. The communication apparatus of claim 12, wherein the search reception enabled period is less than the period for which the communication apparatus dedicates to continuously using the non-search channel for communicating with the first communication apparatus.

* * * * *